Aug. 23, 1949.　　　　　　A. A. MEYER　　　　　　2,479,584
CHUCK
Filed Oct. 3, 1946　　　　　　　　　　　　2 Sheets-Sheet 1
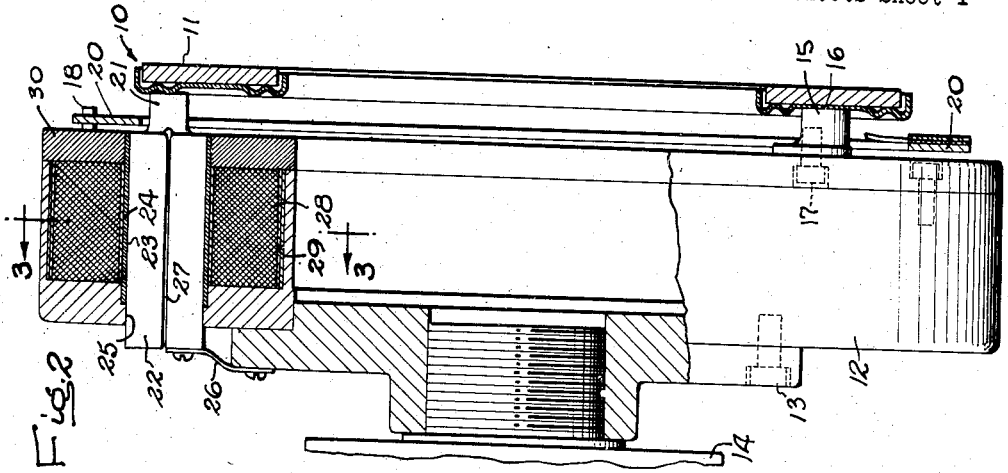
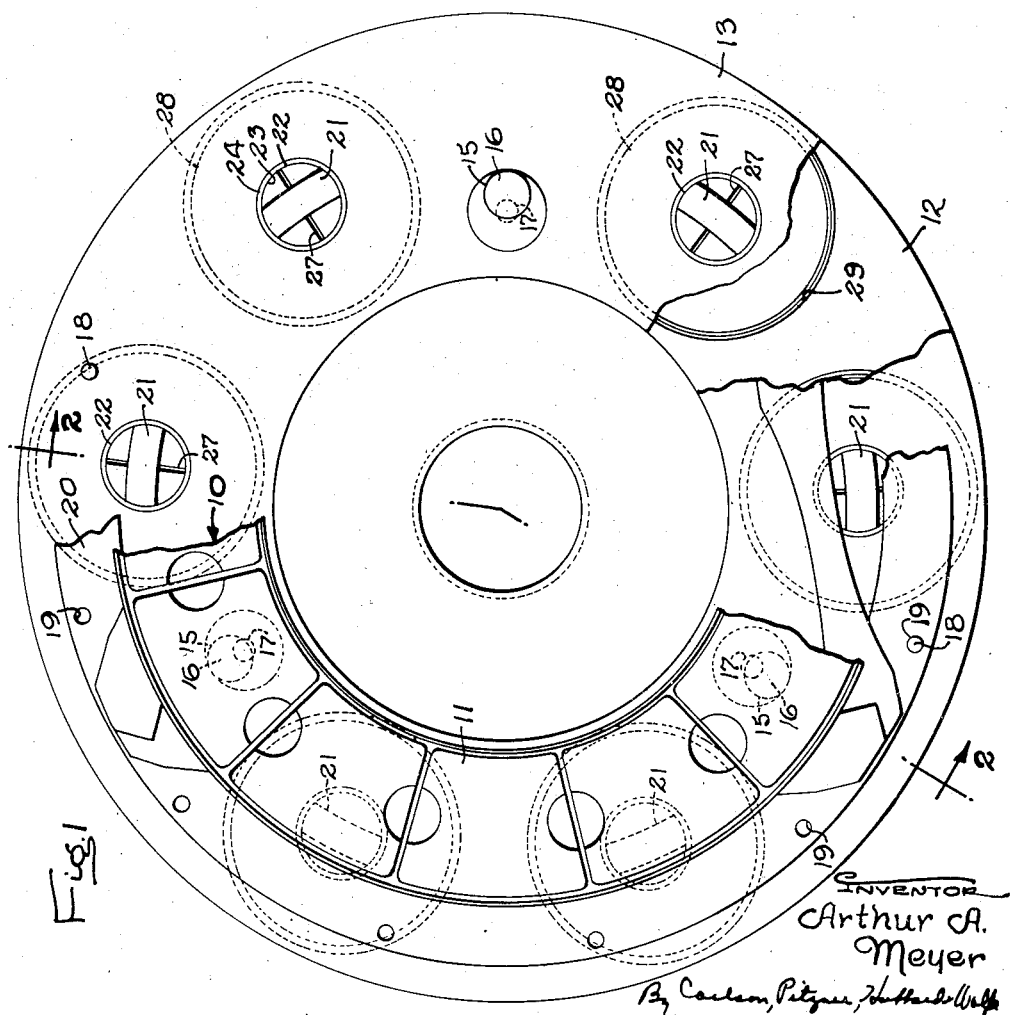
INVENTOR
Arthur A. Meyer
ATTORNEYS Aug. 23, 1949. A. A. MEYER 2,479,584
CHUCK
Filed Oct. 3, 1946 2 Sheets-Sheet 2
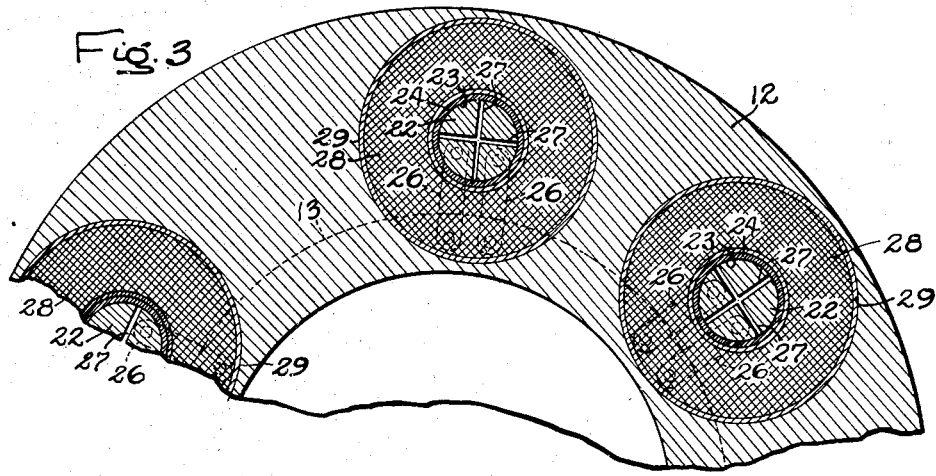
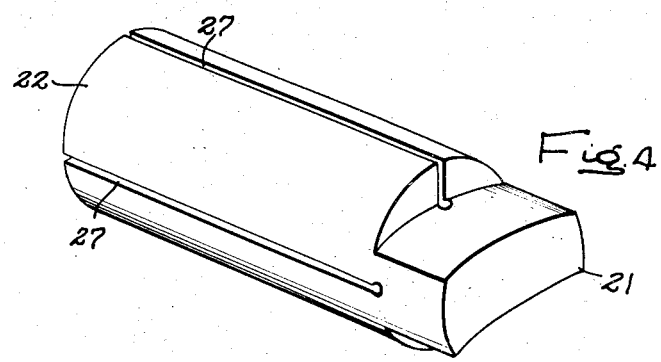
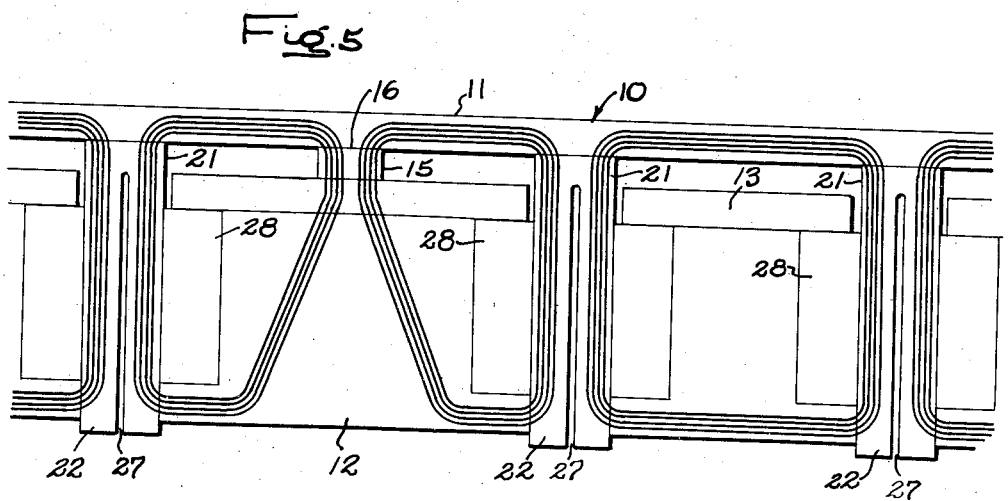
INVENTOR
Arthur A. Meyer
By Carlson, Pitzner, Hubbard & Wolfe
ATTORNEYS Patented Aug. 23, 1949

2,479,584

UNITED STATES PATENT OFFICE 2,479,584

CHUCK

Arthur Albert Meyer, Beloit, Wis., assignor to Warner Electric Brake Manufacturing Company, South Beloit, Ill., a corporation of Illinois Application October 3, 1946, Serial No. 700,960

11 Claims. (Cl. 279—1)

This invention relates to a chuck or holder for receiving a workpiece and supporting the same in a predetermined position while the piece is being machined or otherwise worked on.

One object is to provide a work holder having abutments for locating a workpiece in a desired position and a plurality of other and movable abutments automatically adjustable to the contour of the workpiece and capable of being locked in adjusted position to provide a backing for other parts of the workpiece.

Another object is to provide a work holder of the above character in which the backing abutments are in the form of slidable plungers radially expansible into gripping engagement with their supporting guide surfaces.

A further object is to effect the locking of the backing abutments electromagnetically.

Still another object is to utilize the electromagnetic locking means to perform the additional function of attracting the workpiece to and holding the same against the abutments.

Other objects and advantages of the invention will become apparent from the following detailed description taken in connection with the accompanying drawings, in which Figure 1 is a face view of the improved work holder showing part of a workpiece mounted thereon.

Fig. 2 is a section taken along the line 2—2 of Fig. 1.

Fig. 3 is a fragmentary sectional view taken along the line 3—3 of Fig. 2.

Fig. 4 is a perspective view of one of the backing abutments.

Fig. 5 is a diagrammatic view illustrating the magnetic flux circuits through the workpiece and the locating and backing abutments.

In the form shown in the drawings for purposes of illustration, the improved work holder is especially adapted for supporting and backing a ring-like workpiece 10 composed of magnetic material such as steel while the face 11 of the piece is being turned or otherwise machined. The holder includes generally a support in the form of a steel ring 12 secured rigidly to a flange 13 on a rotary member such as a spindle 14. Projecting parallel to the axis of the ring and from the end thereof are a plurality of studs 15 whose axially facing ends 16 constitute abutments which are adapted to bear against the back of the workpiece at angularly spaced points, three in the present instance, so as to locate the piece axially in a predetermined position. Herein, the studs 15 are secured to the ring 13 by screws 17 located eccentrically relative to the stud axes so that the radial position of the abutments 16 may be varied as desired. The workpiece is located radially by pins 18 on the ring entering holes 19 in a flange 20 of the workpiece when the latter is placed against the abutments 16.

The present invention aims to provide a rigid backing for supporting the portions of the workpiece between the locating abutments 16 so that the workpiece will not be deformed by the axial pressure applied thereto during the machining of its face 11. For this purpose, a plurality of auxiliary abutments 21 are mounted on the ring 12 for movement into engagement with the back of the workpiece at points between the fixed abutments, and, after engagement with the workpiece located by the latter abutments, are adapted to be locked rigidly in the ring. There are six of these auxiliary abutments in the present instance, two disposed between and equally spaced angularly from the fixed abutments 16.

The abutments 21 constitute the outer ends of generally cylindrical plungers 22 slidable in bores 23 extending through the ring 12 parallel to the axis thereof. The wall of the bore which forms a guide for the plunger therein is defined substantially throughout its length by a sleeve 24 of nonmagnetic material which stops short of the back of the supporting ring 12 where the plunger 22, which is composed of magnetic material, slides in direct contact with a magnetic surface 25.

Means is provided for urging the plungers 22 axially toward the workpiece so that the abutments 21 will engage the latter and adapt themselves to the contour of the work automatically as an incident to placing the workpiece against the locating abutments 16. Herein, this means comprises individual springs 26 of the leaf type having one end secured to the flange 13 and the other end secured to the end of the plunger 22 remote from the abutment 21. The springs 26 are stressed to urge the plungers into the ring 12 with sufficient force to insure full engagement of each abutment 21 with the workpiece.

The plungers 22 are adapted for individual radial expansion into firm frictional gripping engagement with the guide surfaces 23 so as to lock the plungers rigidly in the ring 12 after the abutments 21 have engaged and adapted themselves to the work contour. This is accomplished by splitting the plungers longitudinally by slots 27 which divide the plunger substantially throughout the length of the bore 23 into a plurality of sectors which are bendable outwardly against the guide surface.

While radial expansion of the plungers may be effected in various ways without disturbing the location of the work on the fixed abutments, this is preferably accomplished electromagnetically by causing magnetic flux to thread radially of the plunger and the ring 10 thereby attracting the plunger sectors into gripping engagement with the guide surfaces. To this end, electromagnetic coils 28 are disposed in recesses 29 bored in the ring 12 before attachment of a plate 30 thereto. When the coil 28 is energized, magnetic flux is caused to flow along the paths shown in Fig. 5, these extending axially through the abutments 21 and the plungers 22, then radially through the surface 25 and the ring 12, and thence back through the ring to the workpiece which itself completes the flux circuit. Because the flux threads the plunger radially at least at the end remote from the abutments 21, the split sectors are attracted outwardly and drawn into gripping engagement with the guide surface thereby locking the plunger frictionally but nevertheless firmly to the ring 12. With all of the plungers 22 thus locked, the workpiece is backed rigidly at points closely spaced around the piece, and the latter is thus held against deformation during machining of the face 11.

By making the sleeve 24 of nonmagnetic material and making the latter relatively thick, a nonmagnetic gap is interposed between the ring 12 and the forward end of the plunger 22 so as to minimize the leakage of flux around the workpiece. By thus confining the flux flow to the paths shown and directing a substantial part thereof through the workpiece, this same flux which serves to lock the movable abutments 21 to the ring 12 is utilized to perform the additional function of attracting the workpiece against all of the abutments 16 and 21 so that the piece is held firmly in the proper position.

The coils 28 are, of course, arranged to be energized simultaneously so that after the workpiece is located against the abutments 16, it may be locked to the ring simply by energizing the coils 28, the movable abutments 21 having adapted themselves individually to the back of the workpiece as the latter is placed against the fixed abutments 16. To release the piece, it is only necessary to deenergize the coils 28 after which the work may be removed axially from the supporting pins 18.

It will be apparent from the foregoing that the work holder described above permits chucking and unchucking of workpieces rapidly and conveniently and without any special operation to provide the necessary backing between the locating points. This is because the backing abutments are located entirely automatically as an incident to placing the workpiece against the abutments 16, the locking being effected simply by energizing the magnet coils 28. The construction of the holder as a whole is simple and inexpensive, and the magnetic coils 28 are well protected by the ring 12 in which they are embedded.

I claim as my invention:

1. A holder for supporting a workpiece comprising, a support composed of magnetic material, said support having a plurality of abutments thereon engageable with a workpiece to locate the same in a predetermined position, a plurality of plungers of magnetic material guided in said support for endwise movement and engageable at their ends with the workpiece automatically as an incident to positioning the latter on said fixed abutments, said plungers and said support forming magnetic flux circuits each extending successively through the workpiece axially through one end of one of said plungers, and thence radially from the other end of the plunger into said support, each of said auxiliary abutments being radially expansible into gripping engagement with its guide, and means on said support adapted when energized to cause magnetic flux to thread said circuits and not only lock said plungers in the support, but also cause attraction of the workpiece to hold the same against said abutments.

2. A magnetic chuck having, in combination, a support, a plurality of abutments for positioning a workpiece projecting axially from said support, a plurality of axially movable abutments automatically engageable with the supported workpiece to back the latter, means on said support guiding said second abutments and urging the same into engagement with the workpiece supported on said first abutments, and electromagnetic means including a plunger slidable in said support and having one end rigid with said second abutments, the opposite end of the plunger being split and expandable upon energization of said means into engagement with said support to lock the second abutments against movement relative to the support.

3. A magnetic chuck having, in combination, a support, three annularly spaced abutments rigid with said support and engageable with a workpiece to locate the latter, a plurality of movable abutments engageable with the supported workpiece to back the latter at points angularly spaced from said first abutments, means on said support guiding said movable abutments and yieldably urging the same toward the workpiece, electromagnetic means adapted when energized to lock said movable abutments to said support, and means providing a path for causing the magnetic flux produced by said electromagnetic means to thread said abutments and the workpiece supported thereon whereby to attract the workpiece against the abutments.

4. A magnetic chuck having, in combination, a support, a plurality of annularly spaced abutments on said support engageable with a workpiece to locate the same, a plurality of abutments movably mounted on said support and engageable with the supported workpiece to back the latter at points angularly spaced thereon, and electromagnetic means adapted when energized to lock said second abutments to said support and also cause magnetic flux to thread the workpiece to thereby retain the latter against said first abutments.

5. A holder for supporting a workpiece comprising, a support, means providing a plurality of annularly spaced abutments rigid with said support and engageable with a workpiece to locate the same in a predetermined position, a plurality of auxiliary abutments angularly spaced from said fixed abutments and guided in said support for movement into engagement with the workpiece positioned on said fixed abutments, spring means on said support urging said auxiliary abutments toward the workpiece, said auxiliary abutments being expandable radially, and means on said support selectively operable to expand and contract said movable abutments to lock and release the same in said support.

6. In a work holder of the character described, the combination of, a support composed of magnetic material and having a bore therein forming a guide surface, a plunger of magnetic material slidable in said bore and longitudinally split at one end so as to be expandable into gripping engagement with said guide surface, the other end portion of said plunger projecting from said support and providing an axially facing work-locating abutment, and elecromagnetic means on said support adapted when energized to cause a magnetic flux to thread axially through said plunger and radially out through the split end thereof whereby to expand the latter into gripping engagement with said guide surface.

7. A work holder comprising, a support adapted to receive a workpiece and locate the latter in a predetermined position, a plurality of abutments engageable with the workpiece at other points to provide a backing therefor, means on said support guiding said abutments for individual movement and yieldably urging the same toward the positioned workpiece, said abutments engaging the workpiece and adapting themselves automatically to the contour thereof as an incident to placing the workpiece in said predetermined position, and means selectively operable to lock said movable abutments on said support and to release the same therefrom.

8. A holder for supporting a workpiece comprising, a support, means providing a plurality of annularly spaced abutments rigid with said support and engageable with a workpiece to locate the same in a predetermined position, a plurality of auxiliary abutments angularly spaced from said fixed abutments and movably mounted on said support for engagement with the workpiece automatically as an incident to positioning the latter on said fixed abutments, and means on said support energizable and deenergizable selectively to lock and release said movable abutments in said support.

9. A work holder having, in combination, a support, a plurality of abutments rigid with said support and engageable with a workpiece to locate the same, a plurality of abutments engageable with the supported workpiece to back the latter at points annularly spaced therearound, means on said support guiding said second abutments toward the workpiece, and electromagnetic means adapted when energized to lock said second abutments to said support thereby forming a rigid backing for said workpiece.

10. A magnetic chuck having, in combination, means for positioning a workpiece, a plurality of abutments engageable with the positioned workpiece to back the latter, and electromagnetic means adapted when energized to lock said abutments against movement relative to said positioning and thereby form a rigid backing for said workpiece.

11. A magnetic chuck having, in combination, a support, a plurality of spaced abutments on said support engageable with a workpiece to locate the same, a plurality of abutments movably mounted on said support and engageable with the workpiece engaging said first abutments to back the latter at points spaced from the first abutments, means adapted when energized magnetically to lock said movable abutments rigidly to said support, certain of said abutments cooperating with the supported workpiece to form a magnetic circuit extending through the abutting surfaces of the workpiece and abutments, and an electromagnetic winding on said support adapted when energized to cause magnetic flux to thread said magnetic means and said magnetic circuit.

ARTHUR ALBERT MEYER.

REFERENCES CITED

The following references are of record in the file of this patent:

UNITED STATES PATENTS

| Number | Name | Date |
|---|---|---|
| 1,178,020 | Leonard | Apr. 4, 1916 |